US007810307B2

(12) United States Patent
Pellenc et al.

(10) Patent No.: US 7,810,307 B2
(45) Date of Patent: Oct. 12, 2010

(54) LIGHTENED VIBRATING CLAMPS FOR TREE-SHAKING FRUIT HARVESTING MACHINES

(75) Inventors: Roger Pellenc, Pertuis (FR); Christian Rolland, Cucuron (FR)

(73) Assignee: Pellenc (Societe Anonyme), Pertuis (FR)

( * ) Notice: Subject to any disclaimer, the term of this patent is extended or adjusted under 35 U.S.C. 154(b) by 0 days.

(21) Appl. No.: 12/211,080

(22) Filed: Sep. 15, 2008

(65) Prior Publication Data

US 2009/0085364 A1 Apr. 2, 2009

(30) Foreign Application Priority Data

Sep. 28, 2007 (FR) .................................. 07/06834

(51) Int. Cl.
*A01D 46/00* (2006.01)
(52) U.S. Cl. .................................... 56/340.1
(58) Field of Classification Search ............... 56/340.1, 56/329, 330, 328.1
See application file for complete search history.

(56) References Cited

U.S. PATENT DOCUMENTS

| | | | | |
|---|---|---|---|---|
| 3,120,091 A | * | 2/1964 | Gould et al. ................ | 56/340.1 |
| 3,318,629 A | * | 5/1967 | Brandt, Jr. ................ | 294/103.1 |
| 3,494,654 A | * | 2/1970 | Gould et al. ............. | 294/103.1 |
| 3,548,578 A | * | 12/1970 | Shipley, Jr. ................ | 56/340.1 |
| 3,596,972 A | * | 8/1971 | Pool ........................ | 294/103.1 |
| 3,656,283 A | * | 4/1972 | Shipley ........................... | 56/1 |
| 4,070,021 A | * | 1/1978 | Cecka et al. ................. | 473/536 |
| 4,128,986 A | * | 12/1978 | Santarelli .................... | 56/340.1 |
| 4,194,347 A | * | 3/1980 | Peters ....................... | 56/340.1 |
| 4,269,021 A | * | 5/1981 | Friday ........................... | 56/329 |
| 4,286,426 A | * | 9/1981 | Orlando et al. ............... | 56/330 |
| 4,320,618 A | * | 3/1982 | Dandl ........................ | 56/340.1 |
| 4,521,468 A | * | 6/1985 | Brandt ...................... | 428/35.8 |
| 4,768,332 A | * | 9/1988 | Bizzini ..................... | 56/340.1 |
| 4,769,979 A | * | 9/1988 | Merant ......................... | 56/330 |
| 4,903,471 A | * | 2/1990 | Bunnelle ................... | 56/340.1 |
| 5,103,625 A | * | 4/1992 | McCrill ..................... | 56/340.1 |
| 5,123,238 A | * | 6/1992 | Renehan ..................... | 56/329 |
| 5,413,453 A | * | 5/1995 | Hill ............................ | 414/729 |
| 5,489,008 A | * | 2/1996 | Hill ............................... | 184/6 |
| 5,595,054 A | * | 1/1997 | Reynolds de Sousa et al. ......................... | 56/340.1 |
| 5,642,610 A | * | 7/1997 | Dupon et al. .............. | 56/340.1 |
| 5,653,097 A | * | 8/1997 | Hill ........................... | 56/340.1 |
| 5,765,349 A | * | 6/1998 | Michelson ................. | 56/328.1 |
| 5,765,350 A | * | 6/1998 | Ochse ....................... | 56/328.1 |
| 5,816,037 A | * | 10/1998 | Chiel et al. ................ | 56/340.1 |
| 5,927,056 A | * | 7/1999 | Renehan .................... | 56/340.1 |
| 6,658,834 B1 | * | 12/2003 | Mayo ....................... | 56/340.1 |
| 6,801,405 B2 | * | 10/2004 | Boutaghou et al. ....... | 360/265.9 |
| 6,925,792 B2 | * | 8/2005 | Suter et al. ................ | 56/340.1 |

(Continued)

FOREIGN PATENT DOCUMENTS

EP          1210857 A1 *  6/2002

(Continued)

*Primary Examiner*—Árpád Fábián-Kovács
(74) *Attorney, Agent, or Firm*—Egbert Law Offices PLLC

(57) ABSTRACT

Lightened vibrating clamp for machines harvesting fruit by shaking, of the type featuring two jaws capable of being brought closer together or of being placed further apart from each other. At least one of the jaws includes an exterior jacket made of composite material and positioned around a web or core.

12 Claims, 6 Drawing Sheets

U.S. PATENT DOCUMENTS

| | | | |
|---|---|---|---|
| 6,945,022 B2 * | 9/2005 | Suter et al. | 56/328.1 |
| 6,978,591 B2 * | 12/2005 | Zehavi et al. | 56/340.1 |
| 2005/0255935 A1 * | 11/2005 | Yanagisawa et al. | 473/316 |
| 2005/0272536 A1 * | 12/2005 | Takeuchi | 473/520 |
| 2006/0103172 A1 * | 5/2006 | Veen et al. | 296/214 |
| 2006/0211525 A1 * | 9/2006 | Pai | 473/521 |
| 2008/0016838 A1 * | 1/2008 | Pellenc et al. | 56/340.1 |

FOREIGN PATENT DOCUMENTS

| | | | |
|---|---|---|---|
| FR | 2579062 A | * | 9/1986 |
| FR | 2799610 A1 | * | 4/2001 |
| GB | 2373754 A | * | 10/2002 |
| RU | 2032309 C1 | * | 4/1995 |

* cited by examiner

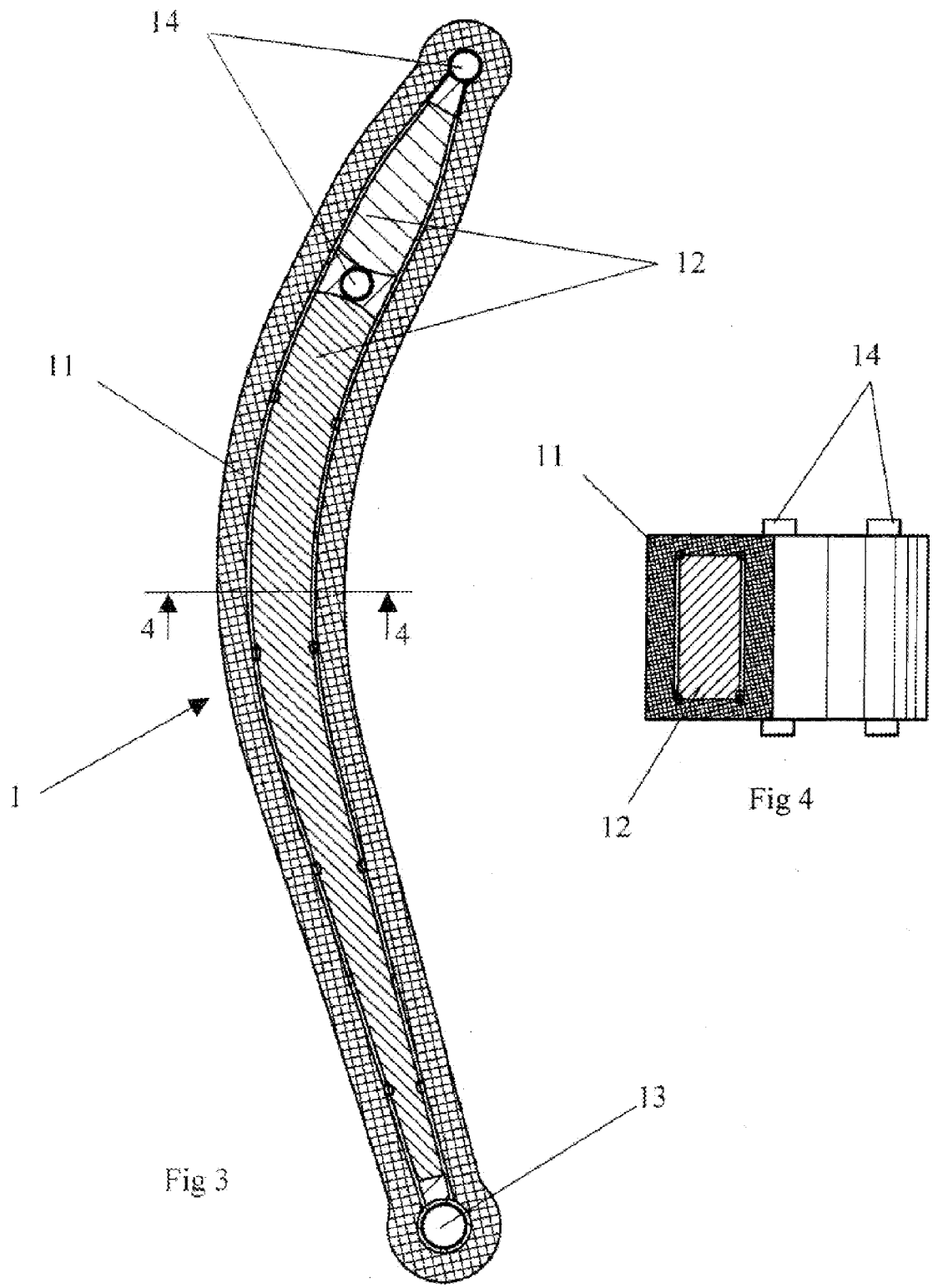

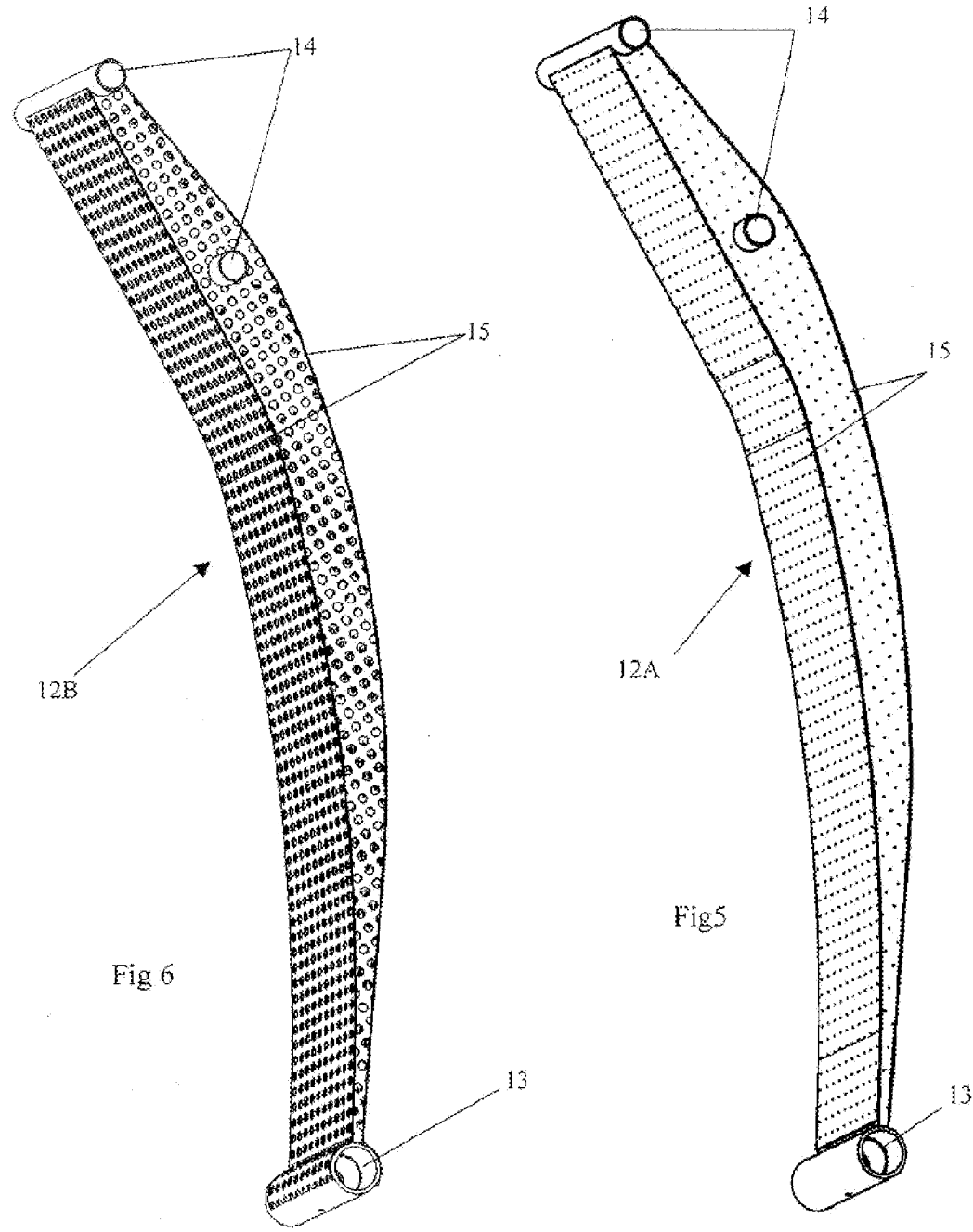

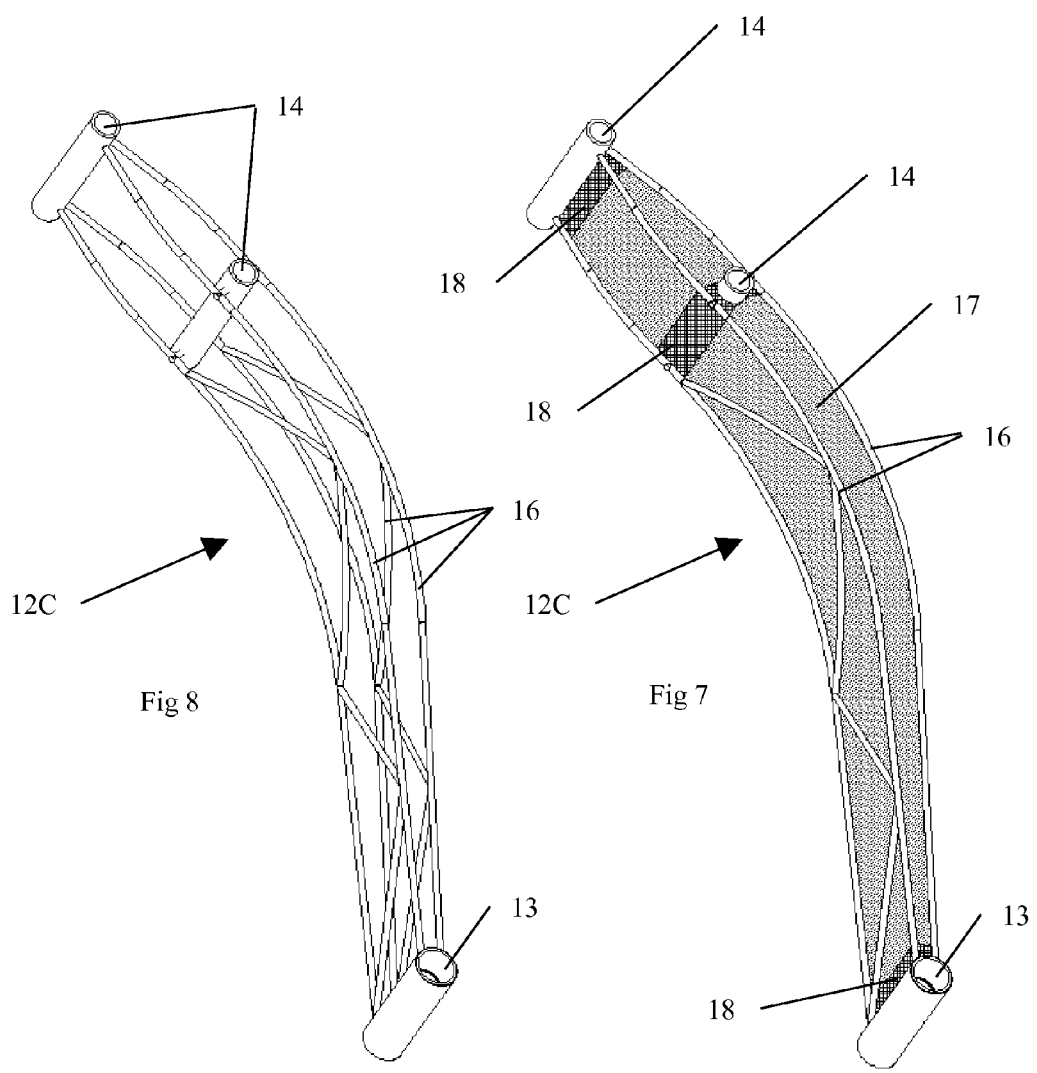

LIGHTENED VIBRATING CLAMPS FOR TREE-SHAKING FRUIT HARVESTING MACHINES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns lightened vibrating clamps for tree-shaking fruit harvesting machines.

More precisely, it concerns vibrating tongs of the type constituted by two jaws of an elongated shape where at least one of them is mobile and whose closing (gripping) and releasing (opening) movements are obtained by one or several actuating, generally hydraulic, cylinders. A vibrator with counter-rotating weights or with alternating displacement weights is attached to the framework of the clamps enabling the transfer of high frequency vibrations to the clamps.

2. Description of Related Art Including Information Disclosed Under 37 CFR 1.97 and 37 CFR 1.98.

Numerous realizations of such vibrating clamps for mechanical fruit harvesting are known.

Vibrating clamps of this kind are for instance described in the following documents: FR-2 799 610 and U.S. Pat. No. 4,903,471. Mounted on vehicles equipped with various devices for controlling and regulating their operation, they allow mechanical fruit harvesting by shaking trees or fruit-bearing bushes such as for instance, walnut trees, almond trees, hazel trees or shrubs, chestnut trees, olive trees, apple trees, plum-trees, Mirabelle trees, cherry trees, coffee-shrubs, pistachio-trees, etc. . . .

Until these last few years, the mechanical harvesting of fruit by means of vibrating clamps took place after the fruit had reached complete ripeness.

In order to improve the quality of the harvested fruit, numerous producers have decided, in recent years, to move up the fruit harvesting dates, so as to be better in phase with the physiological maturity of the fruit. This requires however the utilization of constantly better performing vibrators, taking into account the greater difficulty to detach and drop the fruit, since the forces of abscission of the latter are in effect much greater for harvesting of unripe fruit.

Now, one knows that the vibration force necessary for shaking the trees so as to achieve a complete harvest is very great (several tens of kilowatt). This vibration force is communicated to the tree through the vibrating clamps. The latter is hence submitted to extreme mechanical stresses. On the other hand, to determine the force of vibration to apply in order to generate the vibrations required for obtaining a satisfactory harvest, one must take into account the fact that the weight of the vibrating clamp is to be added to the virtual weight of the tree in motion during the shaking operation on the latter.

To withstand these stresses and to ensure high reliability, the construction of these vibrating clamps is made of resistant and heavy metallic material.

For example the jaws of the vibrating clamps are generally constituted of properly shaped box beams and are composed of an upper plate and a lower plate that are assembled by lateral plates extending from one end to the other of said upper and lower plates and made integral with the latter by welding. The support or supports of the active elements of the vibrating clamp is generally produced according to the same principle.

One drawback of vibrating clamps of this type, which are nevertheless the best performing ones at present, is that they are extremely heavy. As a matter of fact, the heavier the clamp, and the more difficult or even impossible it becomes to work with high frequencies and/or large amplitudes. In addition to that, the high weight of the vibrating clamps constitutes an obstacle to the ability to reach rapid accelerations, which are desirable for ensuring good results.

Another drawback of vibrating clamps of the aforementioned type results from the assembly by welding of the plates constituting in particular their jaws. In fact, it is well known that this process of assembly generates stresses and sometimes incipient cracks in the area assigned to the parts to be assembled. On the other hand, while the vibrating clamps are in operation, the vibrations and stress are very substantial and damage the welds, which crack because of fatigue. Also, the assembly by a welding process of the different parts that need to be rigidly assembled is difficult work requiring the application of safety measures, and the parts assembled in this manner cannot be disassembled, for instance to repair a possible failure of one of them.

Early harvesting requires now the application of greater forces, which are difficult to produce by the tractors or harvesting machines, which have power deliveries and which cannot easily be extended. The tractors and harvesting machines generally are powered by 100 HP combustion engines.

To meet this larger vibration requirement, the only technical solution, with the same power availability, is to reduce the weight of the vibrating clamp. This weight reduction can be obtained by lightening up the various elements of the clamp, knowing that it is not possible to reduce the eccentric weights, which produce the vibrations, because on the contrary, to increase the intensity of the vibrations, it would actually be necessary to increase these weights.

In document FR-2 799 610, a vibrating head has been proposed which features a lightened vibrating clamp each jaw of which consists of two elongated plates made of a material with a high bending yield limit. These plates present the particularity of being obtained by laser cutting and being assembled in superposition and at a distance from each other by means of fastened spacers fastened to the plates by screws.

However, such a vibrating clamp does not present a very significant weight reduction, and hence does not provide a satisfactory solution to the aforementioned problems.

One objective of the present invention is thus to obtain a very substantial reduction of the weight of the vibrating clamps without lessening their capacity to withstand the mechanical stresses of bending, torsion, and shearing, and to stand up to the alternating stresses of fatigue.

BRIEF SUMMARY OF THE INVENTION

According to the invention, this aim has been achieved by having a vibrating clamp of the aforementioned type where at least one jaw consists of an exterior jacket made of a composite material and positioned around a web or core.

According to a preferred method of execution, each of the two jaws of the clamp consists of an exterior jacket made of a composite material positioned around a web or core.

Owing to the invention, a significant lightening of the vibrating clamp is obtained, as its weight is approximately reduced by half, relative to that of vibrating clamps currently available in the market, which makes it possible to improve the power of the vibrations and to achieve the conditions necessary for early harvesting of fruit, without requiring an increase of the power supplied by currently available tractors or harvesting machines.

According to one method of execution, the core is made of rigid alveolar polymer, for instance of polyurethane foam or of polystyrene foam.

According to another method of execution, the core comprises a metallic reinforcement.

According to a first example of execution of this metallic reinforcement, it consists of an assembly of solid or perforated sheet metal on which, for example by welding, inserts are fastened, in particular a fulcrum piece or pieces, and retaining pieces.

According to a second example of execution of said metallic reinforcement, it consists of a trellis or an assembly of rods or metallic bars, for example of metallic wires of small diameter, assembled to each other, for example by welding, and on which are attached, for example by welding, the fulcrum piece or pieces and the retaining pieces.

According to a third example of execution, the openings delimited by the contours of the metallic reinforcements are lined or filled with an alveolar polymer.

According to another characteristic arrangement, the exterior jacket of composite material is made of fiberglass, carbon fiber or aramid fiber, in association with epoxy or polyester resins.

According to a preferred method of execution, the exterior jacket consists of a winding of resin-impregnated bands of fabric made of glass fiber, carbon fiber or aramid fiber.

According to another characteristic arrangement, the holding grips of the clamp are fastened in a removable and interchangeable manner at the free end of the jaws.

According to a first method of execution, the removable and interchangeable grips can have different forms depending on the form and size of the tree trunks or branches that are to be shaken.

According to another method of execution, the removable and interchangeable grips are made of a metallic material, preferably of a light alloy with an aluminum or magnesium base. According to another method of execution, the removable and interchangeable grips are made of a composite material, in particular of fiberglass, carbon or aramid fiber in association with epoxy or polyester resins.

Besides a significant lightening of the vibrating clamps, another major advantage of the invention is its great resistance to the mechanical stresses of bending, torsion and shearing, as well as increased resistance to the alternating stresses of fatigue.

BRIEF DESCRIPTION OF THE SEVERAL VIEWS OF THE DRAWINGS

The aims, characteristics and advantages stated above and still more will become clearer in the following description and the attached drawings.

FIG. 3 is a longitudinal sectional view of this jaw.

FIG. 4 is a cross sectional view along the line 4-4 of FIG. 3.

FIG. 5 is a perspective view of a first example of execution of the core of a jaw of a vibrating clamp.

FIG. 6 is a perspective view of a second example of execution of such a core.

FIG. 7 is a perspective view of a third example of execution of this core.

FIG. 8 is a perspective view of the metallic framing of the core shown in FIG. 7.

Figure 9A:
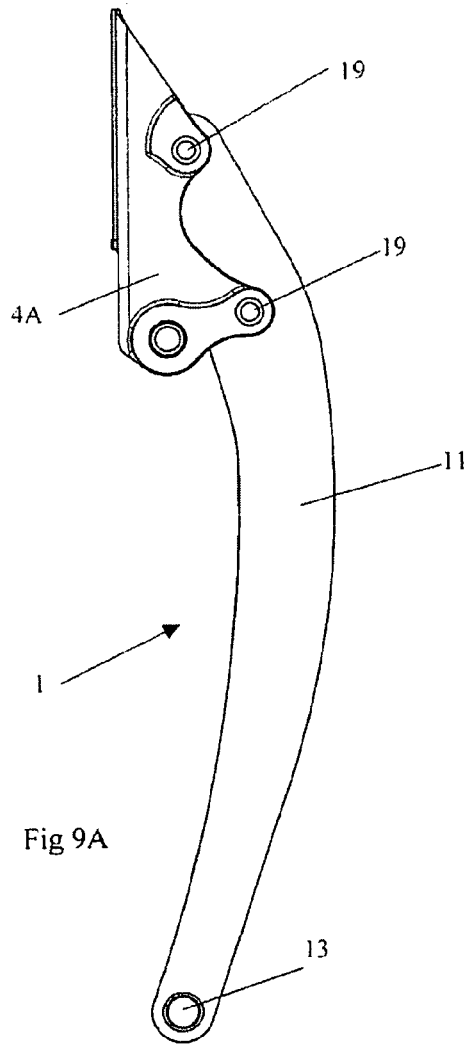
Figure 9B:
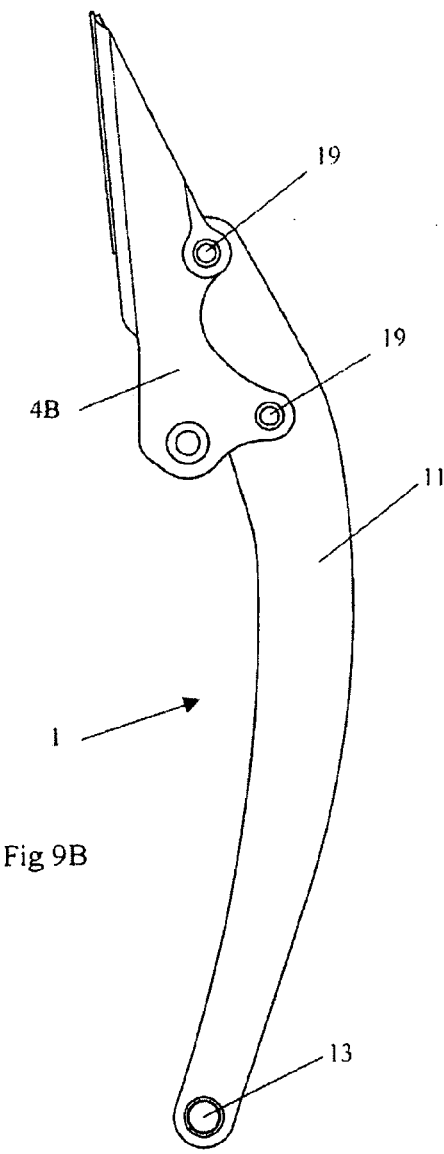

The FIGS. 9A and 9B are front elevation views illustrating two examples of shapes of the grips fastened in a removable and interchangeable manner on the free end of the jaws of the vibrating clamp.

DETAILED DESCRIPTION OF THE INVENTION

Reference is made to those drawings to describe interesting although in no way limiting examples of execution of the lightened vibrating clamp according to the invention.

Figure 1:
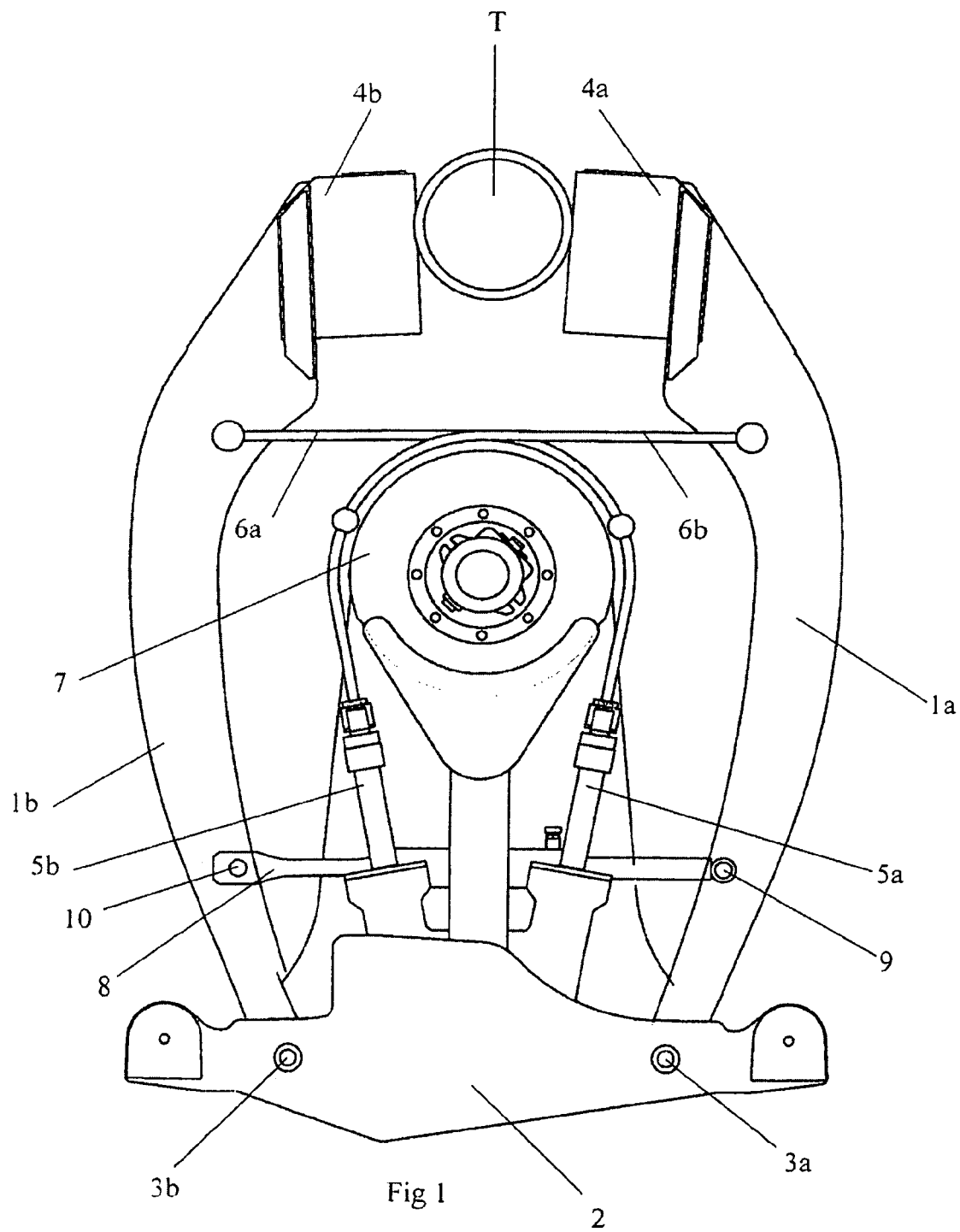
FIG. 1 is a schematic view of an example of execution of the vibrating clamp to which the invention can be applied.
Figure 2:
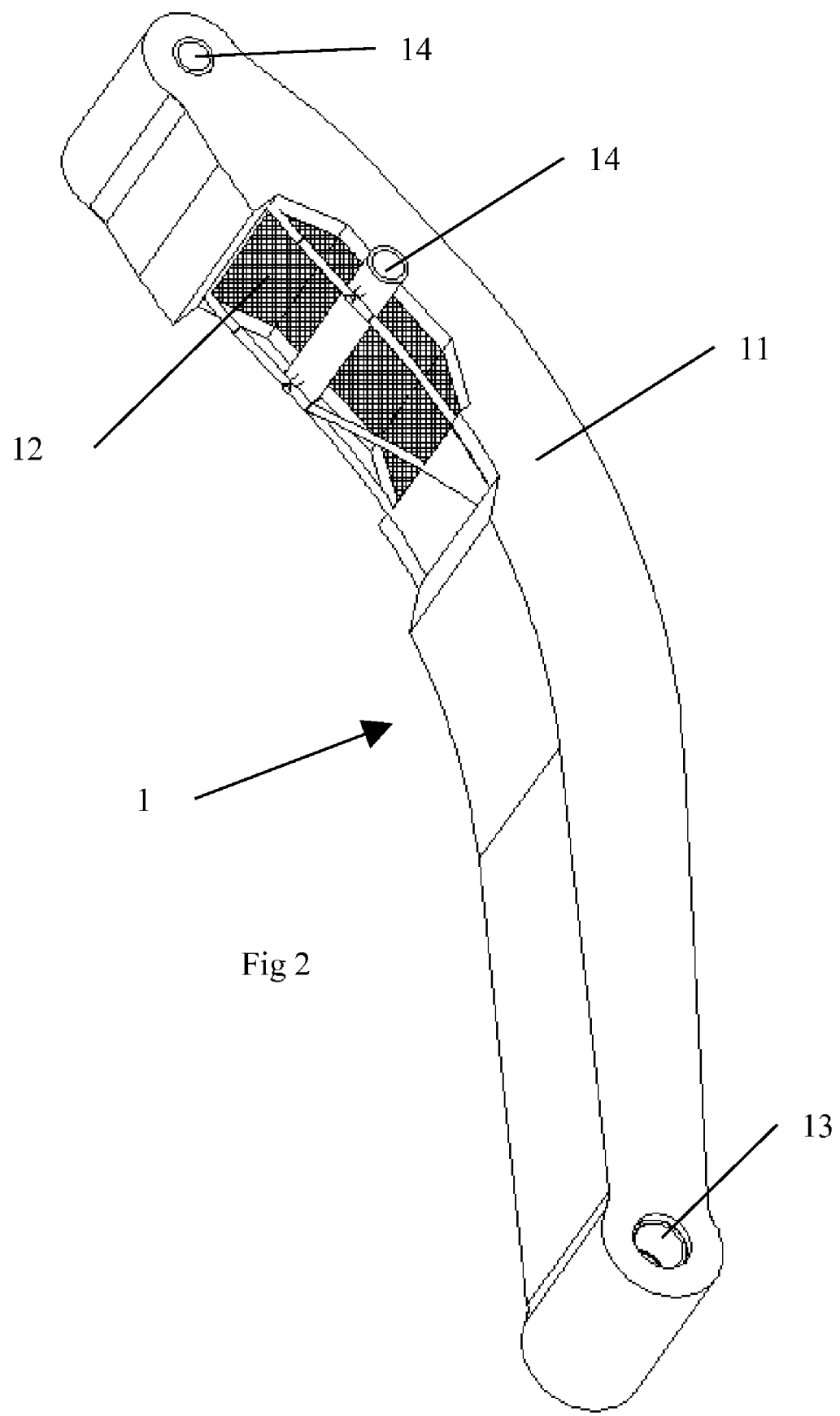
FIG. 2 is a view in perspective, with partial removal of an example of execution of a jaw of the vibrating clamp according to the invention.

In FIG. 1, there is shown, as an example only, a vibrating clamp of the type to which the invention can be applied, this clamp being shown in the gripping position on the trunk T of a tree.

It (the clamp) includes essentially two antagonistic jaws 1a, 1b mounted so they can pivot on a fixed support 2 around the axes 3a and 3b respectively. The free ends of these jaws are provided with grips 4a, 4b respectively, these being themselves equipped, on the active gripping surface, with rubber lining or padding or some other soft material.

According to the example shown, the swiveling of jaws 1a, 1b in the closed position is ensured by the jacks 5a, 5b, which work by pulling, and connected to said jaws by one or several cables 6a, 6b, wound for example around the cylindrical housing 7 enclosing the vibrator. The opening of the clamp is performed by means of a hydraulic jack 8 linked by the intermediary of its opposing ends and by means of articulation 9, 10, to the jaws 1a, 1b respectively, at reduced distance from the articulations 3a, 3b of the latter on the fixed support.

According to an important first characteristic arrangement of the invention, at least one of the two jaws 1 of the vibrating clamp and, preferably, each of these jaws, features an exterior jacket 11 made of composite material and arranged around a web or core 12.

As shown in FIG. 3, the core or web 12 is completely enclosed in the jacket 11 and extends approximately from one end to the other.

The core 12 may be made of different materials.

According to FIG. 5, the core 12A is made of alveolar polymer, for example of polyurethane foam or of polyester foam.

The reference 13 designates a tubular hinge insert which allows a pivoting installation of the jaw, whereas reference 14 designates tubular fastening inserts that may or may not be tapped for the installation of a grip at the end of the jaw.

The core 12 may be made entirely or not of metallic material.

For example, the core may be in the form of a box, obtained by assembly of solid or perforated sheet metal. FIG. 6 shows a core 12B made in the form of an elongated box consisting of perforated sheet metal 15. On this metallic core 12B are attached, for example by welding, the hinge insert or inserts 13 and the fastening insert 14.

The core 12C shown in FIGS. 7 and 8 consists of a trellis 16 or an assembly of rods or metallic bars, for example consisting of small diameter round wires which are assembled to each other, for example by welding, and on which are fastened, for example by welding, the hinge insert or inserts 13 and the fastening insert 14.

Preferably, the openings delimited by the contours of the metallic reinforcement consisting, for example, of the assembly of sheet metal 15 or of the trellis 16, are lined or filled with an alveolar polymer 17, for example of polystyrene foam.

According to advantageous methods of execution, the exterior jacket on composite material 11 may be made of:
fiberglass;
carbon fiber;
aramid fiber; or
a mixture of these materials, in association with epoxy resins or polyester resins.

Preferably the exterior jacket 11 consists of a winding, around the core 12, of bands of fabric made of glass fiber, carbon fiber or aramid fiber impregnated with epoxy resin or polyester resin.

In order to reinforce the rigidity of inserts 13, 14 relative to jacket 11, resin compound blocks 18 are integrated into the core 12 around said inserts and in contact with them.

These compound blocks may be made after the execution of the jacket 11, by injection through the jacket of a compound resin into volume spacings made inside the core structure 12, around or in proximity of the hinge part or parts 13 or the fastening parts 14.

According to another interesting characteristic arrangement, the grips 4A or 4B of the clamp are attached in a removable and interchangeable manner on the free end of the jaws 1, for example by means of fasteners 19 going through orifices made in said grips and the fastening pieces 14 installed at the free end of the jaws 1 (FIGS. 9A and 9B).

The removable and interchangeable grips may have different shapes adapted to the conformation of the trunks and branches of the fruit trees and/or to the size of said tree trunks or branches.

They may be made of light and resistant metallic material, preferably of a light alloy on an aluminum or magnesium base.

Advantageously they may be made of composite material, in particular of fiberglass, carbon fiber, or aramid fiber in association with epoxy or polyester resins, in analogy to the jaws 1a, 1b.

Likewise, the other rigid components of the vibrating clamp, such as, for instance, the body of the clamp 2, and/or the housing 7 enclosing the vibrator, and/or the bodies of the jacks 5a, 5b, and/or the link elements between the gripping jacks 5a, 5b and the jaws 1a, 1b, when said elements are constituted by connecting rods, may also be made of composite material, in particular of fiberglass, carbon fiber or aramid fiber, in association epoxy or polyester resins, in a comparable manner to the jaws 1a, 1b.

On the other hand, when the link elements (6a, 6b) between the gripping jacks 5a, 5b and the jaws 1a, 1b are made of a pliable material, for instance in the form of straps or cables, these elements may be made of highly resistant textile material, for example of Deenema, carbon fiber or aramid fiber.

We claim:

1. A vibrating clamp apparatus comprising:
a support;
a first jaw pivotally connected to said support and extending outwardly therefrom;
a second jaw pivotally connected to said support in spaced relation to said first jaw, at least one of said first and second jaws comprising:
a core being of a metallic framework; and
a jacket extending over an exterior of said core, said jacket being formed of a composite material;
a first grip affixed to an end of said first jaw opposite said support;
a second grip affixed to an end of said second jaw opposite said support; and
a jacking means connected to said first and second jaws for moving said first and second jaws in relation to each other, said metallic framework having a hinge member at one end thereof, said hinge member being pivotally connected to said support, said metallic framework having a fastening member at an opposite end thereof, said fastening member connected to one of said first and second grips.

2. The vibrating clamp apparatus of claim 1, each of said first and second jaws comprising said core and said jacket extending over said exterior of said core.

3. The vibrating clamp apparatus of claim 1, said metallic framework being a trellis, at least one of said hinge member and said fastening member being attached to said trellis.

4. The vibrating clamp apparatus of claim 3, said trellis having open areas formed therein, said open areas being filled with an alveolar polymer material.

5. The vibrating clamp apparatus of claim 1, said composite material of said jacket selected from the group consisting of fiberglass, carbon fiber and aramid fiber.

6. The vibrating clamp apparatus of claim 1, said composite material of said jacket being a winding of a fabric band impregnated with a resin, said fabric band being of a material selected from the group consisting of fiberglass, carbon fiber and aramid fiber.

7. The vibrating clamp apparatus of claim 1, said first grip being removably attached to said first jaw, said second grip being removably attached to said second jaw.

8. The vibrating clamp apparatus of claim 1, each of said first and second grips being formed of a metallic material.

9. The vibrating clamp apparatus of claim 1, each of said first and second grips being formed of a composite material.

10. The vibrating clamp apparatus of claim 1, further comprising:
a vibrating means for vibrating said first and second jaws;
a cylindrical housing enclosing said vibrating means;
a first link element connected to said support and extending over a portion of said cylindrical housing, said first link connected to said first jaw; and
a second link element connected to said support and extending over another portion of said cylindrical housing, said second link element connected to said second jaw.

11. The vibrating clamp apparatus of claim 10, each of said first and second link element being formed of a flexible material.

12. A vibrating clamp apparatus comprising:
a support;
a first jaw pivotally connected to said support and extending outwardly therefrom;
a second jaw pivotally connected to said support in spaced relation to said first jaw, at least one of said first and second jaws comprising:
  a core being of a alveolar polymer framework; and
  a jacket extending over an exterior of said core, said jacket being formed of a composite material;
a first grip affixed to an end of said first jaw opposite said support;
a second grip affixed to an end of said second jaw opposite said support; and
a jacking means connected to said first and second jaws for moving said first and second jaws in relation to each other, said jaws in relation to each other, said alveolar polymer framework having a hinge member at one end thereof, said hinge member being pivotally connected to said support, said alveolar polymer framework having a fastening member at an opposite end thereof, said fastening member connected to one of said first and second grips.

* * * * *